(12) United States Patent
Pettersson et al.

(10) Patent No.: US 6,304,595 B1
(45) Date of Patent: Oct. 16, 2001

(54) METHOD AND APPARATUS RELATING TO MOBILE TELEPHONE MODEMS

(75) Inventors: Mats Pettersson, Sofiavägen (SE); Espen Kristensen, Kristiansand; Börre Fjeldsö, Havsöyv, both of (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/213,059

(22) Filed: Dec. 16, 1998

(30) Foreign Application Priority Data

Dec. 17, 1997 (SE) .................................................. 9704760

(51) Int. Cl.$^7$ ................................. H04B 1/38; H04L 5/16
(52) U.S. Cl. ...................... 375/222; 375/228; 379/93.08
(58) Field of Search ..................................... 375/219, 220, 375/222, 224, 228–356; 379/93.07, 93.08–93.14, 93.31, 93.32, 93.34

(56) References Cited

U.S. PATENT DOCUMENTS

| | | |
|---|---|---|
| 5,202,899 | 4/1993 | Walsh . |
| 5,408,520 * | 4/1995 | Clark et al. ......................... 379/93.07 |
| 5,428,671 | 6/1995 | Dykes et al. . |
| 5,490,209 | 2/1996 | Kennedy et al. . |
| 5,535,242 | 7/1996 | Brigida et al. ......................... 375/222 |
| 5,737,397 * | 4/1998 | Skinner et al. .................... 379/93.29 |
| 5,999,565 * | 12/1999 | Locklear, Jr. et al. ............... 375/222 |
| 6,195,359 * | 2/2001 | Eng et al. .............................. 370/401 |

FOREIGN PATENT DOCUMENTS

| | | |
|---|---|---|
| 0695075 A1 | 1/1996 | (EP) . |
| WO9411999 A2 | 1/1996 | (EP) . |
| WO9635300 A1 | 11/1996 | (WO) . |

OTHER PUBLICATIONS

Hedman, P.; International Type Search Report; Search Request No. SE 97/01561; Oct. 8, 1998; pp. 1–4.

* cited by examiner

*Primary Examiner*—Stephen Chin
*Assistant Examiner*—Lenny Jiang
(74) *Attorney, Agent, or Firm*—Jenkens & Gilchrist, A Professional Corporation

(57) ABSTRACT

The present invention relates to methods and arrangements pertaining to mobile telephone modems. According to the invention, the mobile telephone modem includes memory means in which one or more ranking orders of data bearer services is/are stored. In response to a call request, one of the stored ranking orders is selected. If only one ranking order is stored, this ranking order will, of course, be selected. Calling is first carried out with the highest ranked data bearer service in the selected ranking order. If a call connection is not made, it is determined on the basis of an error message from the mobile telephone network whether or not the highest ranked data bearer service is supported by the mobile telephone network. If the highest ranked data bearer service is not supported by the mobile telephone network, the calling procedure is repeated sequentially with respect to the lower ranked data bearer services, until a call connection has been made or until it is determined that the data bearer service concerned is supported by the mobile telephone network but that connection of the call has, nevertheless, been unsuccessful, for instance because the called DTE unit is engaged or disconnected.

17 Claims, 2 Drawing Sheets

METHOD AND APPARATUS RELATING TO MOBILE TELEPHONE MODEMS

FIELD OF INVENTION

The present invention relates to the field of methods and arrangements that pertain to mobile telephone modems, and in particular to that part of this technical field which is concerned with establishing data communication with data bearer services through the medium of a mobile telephone network.

BACKGROUND OF THE INVENTION

In the case of data communication between so-called DTE equipment (Data Terminal Equipment)—such as PCs (Personal Computers), other forms of computers or like appliances—so—called TAE equipment (Terminal Adapter Equipment) is normally used to suitably adapt the digital representation of the DTE equipment to the communication network or networks used in the communication. Examples of communication networks that can be involved in such data communication are PSTN networks (Public Switched Telephone Networks, that is to say a typical telephone network), digital PLMN networks (Public Land Mobile Networks, that is to say a mobile telephone network) and an ISDN network (Integrated Services Digital Network).

TAE equipment used in communication with a PSTN network is normally referred to as a modem (abbreviation of modulator/demodulator). The modem modulates digital signals from the DTE equipment, so as to enable the signals to be transmitted via the PSTN network, and demodulates signals from the PSTN network to digital signals that can be understood by the DTE equipment.

TAE equipment used with an ISDN network is normally referred to as an ISDN adapter. An ISDN adapter converts between protocols that are used by the DTE equipment to protocols that are used over an ISDN network. Examples of such protocols are V.110 and X.25, which are specified by ITU.

TAE equipment used in communication with a PLMN network is normally referred to as a mobile telephone modem. The mobile telephone modem is not strictly a modem from a technical aspect, but rather a data converter that is connected between the DTE equipment and a mobile telephone. However, the mobile telephone modem fulfils the same functions as a modem in respect of DTE equipment, and enables the functions of the PLMN network to be utilized when coupled to the mobile telephone. A mobile telephone modem for the GSM system (Global System for Mobile communication) is also referred to as a GSM modem or GSM Data Card.

Co-operation between DTE equipment and TAE equipment is normally controlled by so-called AT-commands (AT is an abbreviated form of attention) transmitted between the DTE equipment and the TAE equipment. For instance, the DTE equipment can order calling, pausing, waiting for a ringing signal, and so on. In turn, the TAE-equipment can utilize the AT-commands to inform the DTE-equipment that it is engaged, that data transmission has been terminated, that no ringing tone has been obtained, and so on. The AT-commands were first introduced by the modem company Hayes and are today generally used with all modems and mobile telephone modems. However, other communication protocols that have a function corresponding to the function of the AT-commands also exist.

A given data bearer service specifies the parameters that shall be used in respect of data communication. These parameters may be, for instance, data rate, the number of start and stop bits, indication as to whether a synchronous or asynchronous communications mode shall be used, and an indication as to whether error correction shall be used over the communications link. For instance, there is found in the GSM system a number of ETSI-specified methods of arranging data communication. A special error correction protocol—RLP (Radio Link Protocol)—can be used. The RLP service is often referred to as a non-transparent service, whereas when RLP is not used, the service is consequently referred to as a transparent service. Start and stop bits can be used for each data packet. It is also possible to utilize the fact that the datastream in the GSM system is synchronous, thereby obviating the need to use start and stop bits. This enables the effective data rate to be increased. It is also possible to specify the actual data rate. Speeds of 2400, 4800 and 9600 bps can be used at present time, although data rate will be increased in the future. For instance, the data rate will be increased in the GSM system eight-fold, and will, of course, be increased still further in future broadband systems.

Not all data bearer services are supported by all PLMN networks. This is a drawback to the user. It is true that the data bearer service to be used can be set-up with the aid of the AT-commands, although in order for this to be achieved it is necessary for the user to be aware of :

Those data bearer services that are supported by the PLMN network.

Those data bearer services that are most beneficial to the user.

And how the AT-commands shall be used.

However, the normal user is not normally aware of these requirements. In order to circumvent this drawback, the mobile telephone modem is therefore default set to a data bearer service that is supported by all PLMN networks of the kind for which the modem is intended. Such is the case, for instance, with the GSM modem ERICSSON DC23, where one asynchronous and transparent data bearer service is default. The use of a default setting of the data bearer service means, of course, that the user will not normally obtain access to the data bearer service that is most beneficial to the user.

SUMMARY OF THE INVENTION

The present invention addresses the problem of obtaining a mobile telephone modem with which data communication can be established with data bearer services through a mobile telephone network in a simpler manner, so as to enable a user to obtain more readily a data-bearer service-setting that is advantageous to the user.

The aforesaid problems are resolved generally as follows: The mobile telephone modem includes storage means in which one or more rankings of data bearer services are stored. When a call connection is requested, one of the stored ranking orders is selected—if only one ranking order is stored in said storage means, this ranking order will, of course, be selected. Calling is effected first with the highest ranked data bearer service in the selected ranking order. If no call connection is set-up, it is ascertained whether or not the highest ranked data bearer service is supported by the mobile telephone network on the basis of an error message from said network. If the highest ranked data bearer service is not supported by the mobile telephone network, the calling procedure is repeated sequentially for all lower ranked data bearer services, until a call connection is set-up or until it is established that the data bearer service concerned is supported by the mobile telephone network but that a call connection cannot, nevertheless, be set-up, for instance because a called DTE unit is engaged or has been disconnected.

The object of the invention is thus to provide a mobile telephone modem that is able to establish data communication automatically with the data bearer service that provides the best possible benefit in one sense or another. The invention also includes methods and arrangements by means of which this object can be achieved.

More specifically, the aforementioned problem is solved as follows: It is proposed in accordance with the invention that the data bearer services are given ranking orders in different ways. For instance, the data bearer services may be ranked in accordance with call set-up time, data rate, availability, or robustness. It is also proposed in accordance with the invention that the mobile telephone modem is designed to update the ranking orders or the method of selecting ranking orders on the basis of one or more information parameters that disclose which data bearer service is most beneficial with regard to the communication situation concerned.

Such information parameters may be fetched from a mobile telephone, for instance.

One primary advantage afforded by the invention is that the user obtains access to an advantageous, or beneficial, data bearer service, without needing to have any depth of knowledge with regard to data bearer services, mobile telephone network functions or the modus operandi of the mobile telephone modem.

The invention will now be described in more detail with reference to preferred embodiments thereof and also with reference to the accompanying drawings.

DETAILED DESCRIPTION OF PREFERRED EMBODIMENTS

Figure 1:
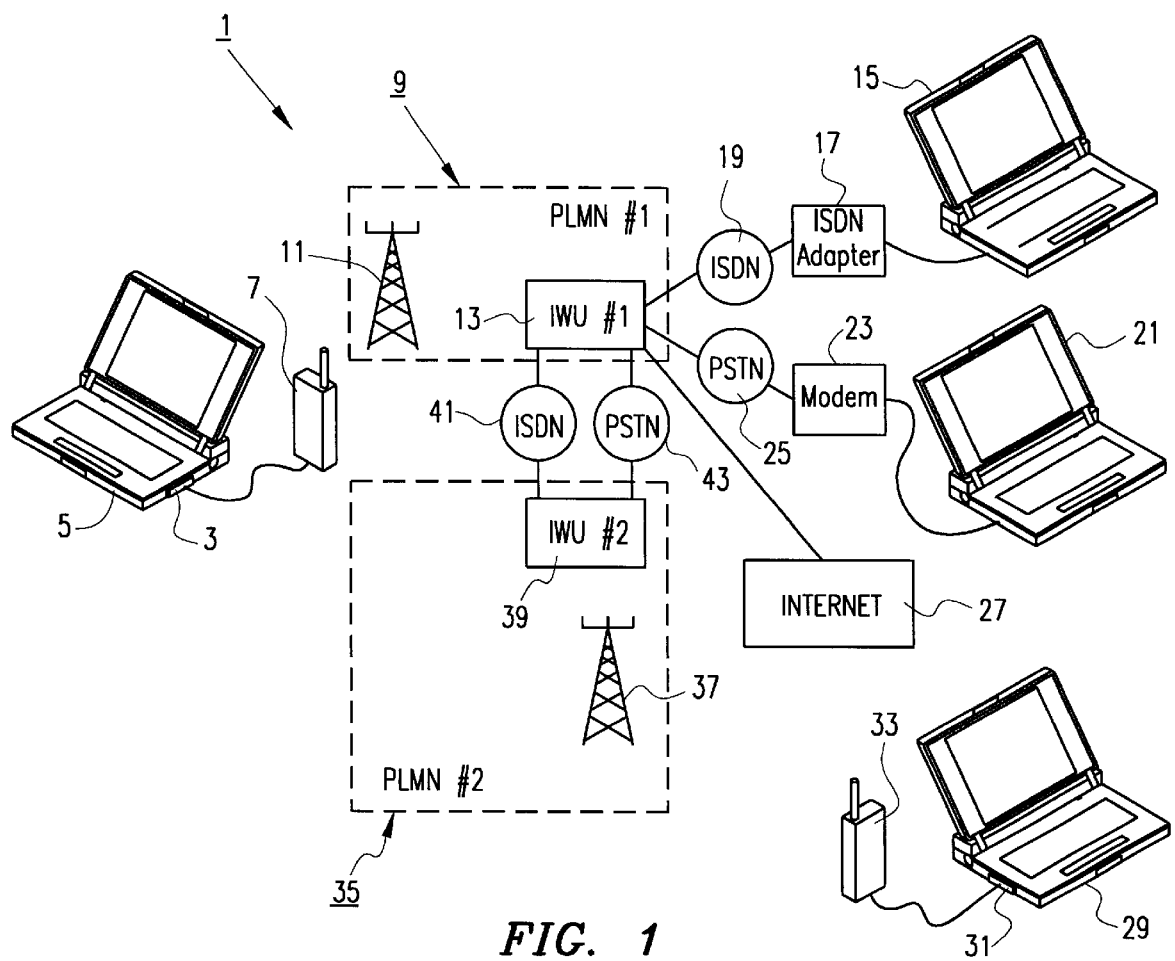
FIG. 1 is an overview illustrating data communication between DTE equipment with the use of TAE equipment.

FIG. 1 is an overview illustrating data communication between DTE equipment with the use of TAE equipment in a telecommunications system 1. A first mobile telephone modem 3 is connected between a first personal computer 5 and a first mobile telephone 7. The telecommunications system 1 includes a first PLMN network 9, which may be a GSM system. The first mobile telephone 7 is connected to the first PLMN network 9 via a first base station 11. Naturally, the first PLMN network will in reality include more base stations than the illustrated first base station 11, these other base stations not being shown in FIG. 1 for the sake of simplicity.

Also shown in FIG. 1 are a number of DTE appliances with which the first personal computer 5 is able to establish data communication via the first PLMN network 9, with the aid of the first mobile telephone modem 3 and the first mobile telephone 7. Data communication may be established, for instance, with a respective second, third and fourth personal computer 15, 21 and 29, respectively.

The second personal computer 15 is connected to a first ISDN network 19 through the medium of an ISDN adapter 17. The first ISDN network 19 is connected to a first Inter working unit 13 (IWU) included in the first PLMN network 9. The first inter working unit 13 enables the first PLMN network 9 to communicate with other networks in the telecommunications system 1. Thus, data can be transferred from the first personal computer 5 to the second personal computer 15 via the first mobile telephone modem 3, the first mobile telephone 7, the first PLMN network 9 (via the first base station 11 and the first inter working unit 13), the first ISDN network 19 and the ISDN adapter 17, in that order. Naturally, data can also be transferred correspondingly in the opposite direction.

The third personal computer 21 is connected to a first PSTN network 25 via modem 23. The first PSTN network 25 is connected to the first inter working unit 13. Data can thus be transferred from the first personal computer 5 to the third personal computer 21 via the first mobile telephone modem 3, the first mobile telephone 7, the first PLMN network 9, the first PSTN network 25 and modem 23. Data can, of course, be transferred correspondingly in the opposite direction.

The fourth personal computer 29 is connected to a second mobile telephone modem 33 via a second mobile telephone modem 31. The second mobile telephone 33 is connected to a second PLMN network 35 via a second base station 37 that is included in the second PLMN network 35. The second PLMN network 35 includes a second inter working unit 39, which is connected to a second ISDN network 41 and a second PSTN network 43. The second ISDN network 41 and the second PSTN network 43 are also connected to the first inter working unit 13 in the first PLMN network 9. The first PLMN network 9 is thus connected to the second PLMN network 35 via the second ISDN network 41 or the second PSTN network 43. Data can thus be transferred from the first personal computer 5 to the fourth personal computer 29 via the first mobile telephone modem 3, the first mobile telephone 7, the first PLMN network 9, the second ISDN network 41 or the second PSTN network 43, the second PLMN network 35 (via the second inter working unit 39 and the second base station 37), the second mobile telephone 33 and the second mobile telephone modem 31, in that order. Data may, of course, be transferred correspondingly in the opposite direction.

FIG. 1 also illustrates a possibility of data communication with the first personal computer. The first inter working unit 13 is connected to Internet 27. Thus, the first personal computer 5 can couple to an Internet service via the first mobile telephone modem 3, the first mobile telephone 7 and the first PLMN network 9 in that order.

A study of FIG. 1 will show that the user of the first personal computer 5 must have and be able to master a large amount of knowledge in order to establish data communication with a beneficial data bearer service. Firstly, the user must be aware of which data bearer services are available and which of these services is most beneficial to him or her. The user must also have a thorough knowledge of the telecommunications system 1 in order to determine which data bearer services can be used for the data communication concerned. The user must also know how the AT-commands, or the like, can be used to set up the data bearer service to be used. If the user does not have this knowledge, he/she is normally referred to the use of a data bearer service that is not the most beneficial for his/her requirements. However, there is proposed in accordance with the invention, hereinafter described in detail, a procedure in which the user can obtain access to a beneficial data bearer service without in-depth know-how.

Figure 2:
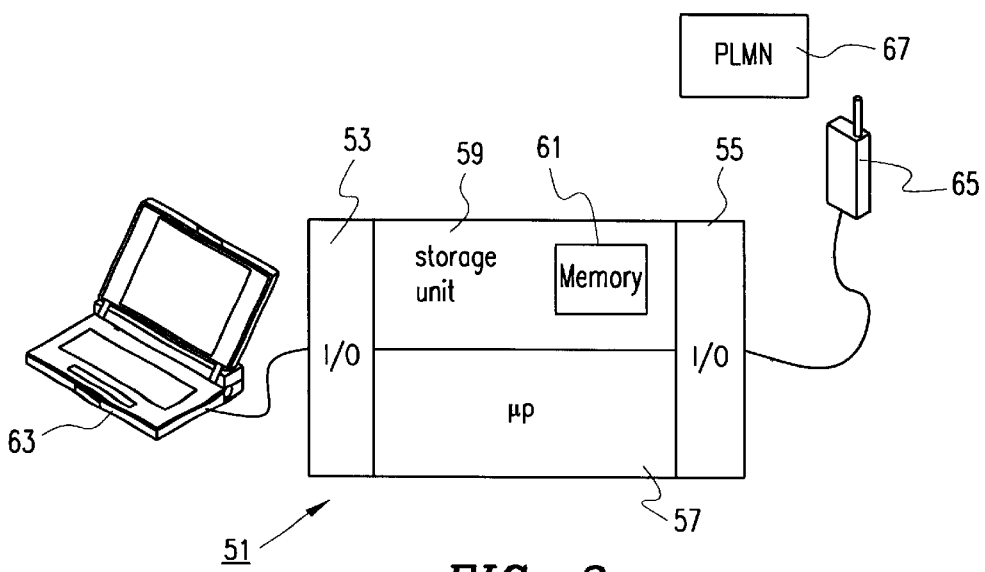
FIG. 2 illustrates an example of the construction and use of a mobile telephone modem according to the present invention.

FIG. 2 illustrates by way of example the construction and use of a mobile telephone modem 51 in accordance with the present invention. The mobile telephone modem 51 includes a first communications interface 53 for communication with a DTE unit 63, a second communications interface 55 for communication with a mobile telephone 65. The mobile telephone 65 is connected to a PLMN network 67 which, in turn, is connected with a plurality of communications networks (not shown). The mobile telephone modem 51 also includes a processor unit 57 and a storage unit 59. The processor unit 57 is adapted to control the work of the mobile telephone modem 51 with the aid of a program stored in the storage unit 59. The storage unit 59 also includes storage means adapted for storing data that describes a ranking order DBS(1), . . . , DBS(N) of data bearer services. In this respect, DBS(1) and DBS(N) denote respectively the highest and the lowest ranked data bearer services in the N-number of data bearer services in the ranking list. The memory devices involved in storing the ranking orders of data bearer services DBS(12), . . . , DBS(N) are indicated symbolically in FIG. 2 with a block 61.

Figure 3:
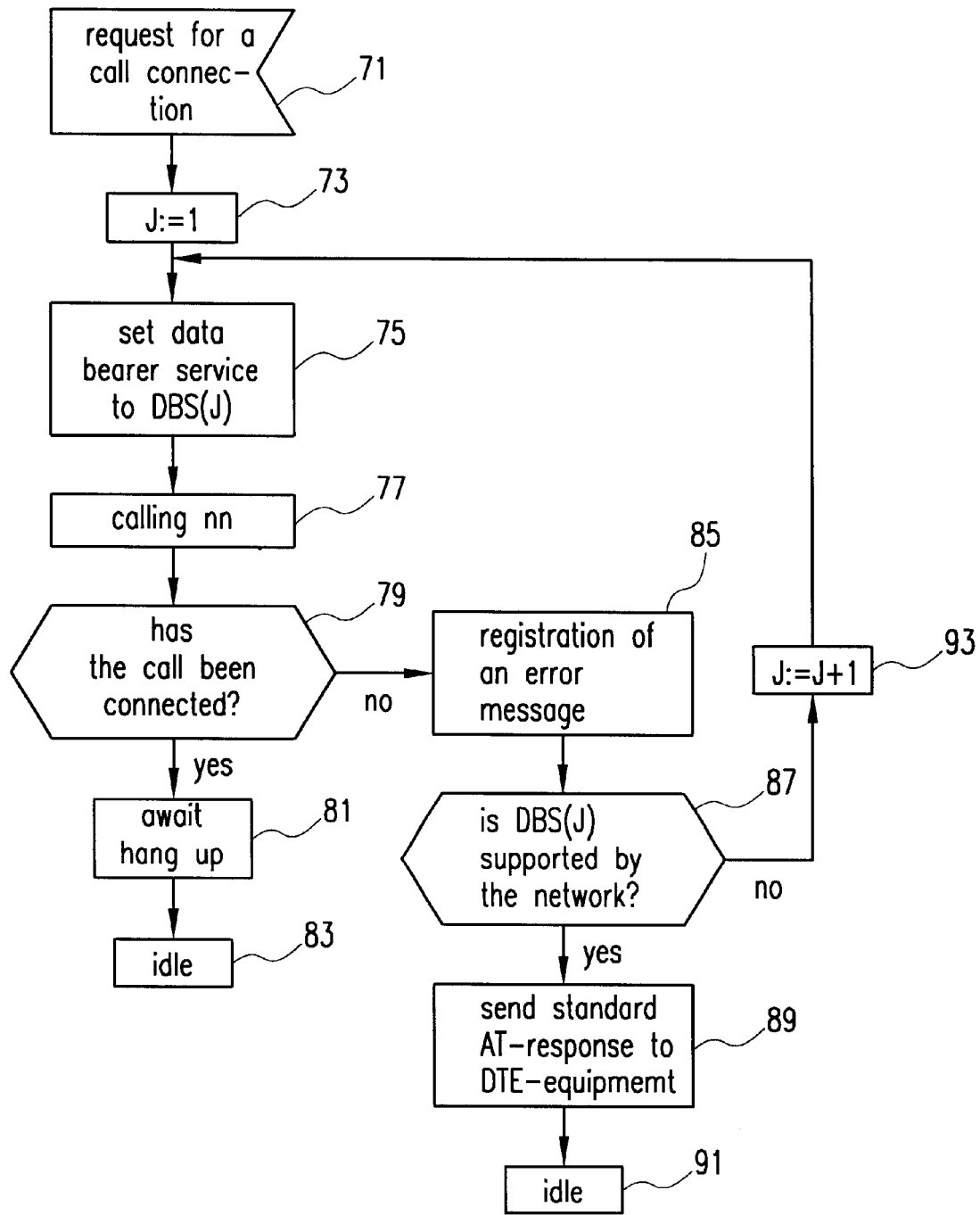
FIG. 3 is a flowchart that describes one example of how an inventive mobile telephone modem is adapted to operate in setting up data communication.

FIG. 3 is a flowchart that illustrates by way of example the manner in which the mobile telephone modem 51 operates when establishing data communication with data bearer services via the PLMN network 67.

The procedure illustrated in FIG. 3 is commenced with a first step 71 in which the mobile telephone modem 51 receives from the DTE unit 63 a request to call number nn (AT-commands: ATDnn).

The procedure in FIG. 3 then continues with a second step 73, in which a count-variable J is set to one.

The procedure in FIG. 3 then continues with a third step 75, in which the data bearer service setting concerned is set to DBS(J). DBS(J) is fetched in this regard from the ranking order of data bearer services DBS(1), . . . , DBS(N), stored in the memory unit 59.

Since the count-variable J has initially been set to one, the data bearer service setting concerned will thus be set to DBS(1) (the highest ranked data bearer service in the ranking order) when the third step 75 is carried out for the first time.

The procedure in FIG. 3 continues with a fourth step 77, in which the number nn is called. The mobile telephone 65 signals the desired number nn together with other necessary information required for utilizing existing calling mechanisms via the PLMN network 67, including the data bearer service setting DBS(J) concerned.

The procedure illustrated in FIG. 3 then continues with a fifth step 79, in which it is determined whether or not the call has been connected. In this respect, the call is considered to have been connected when the mobile telephone 65 has received signalling from the PLMN network 67 confirming that a connection has been made. The DTE equipment 63 is informed that the call has been connected, by a so-called CONNECT message specified by the AT-commands.

When it is decided in the fifth step 79 in FIG. 3 that a call connection has been set-up, there is carried out a sixth step 81 in which the mobile telephone modem awaits hang-up. Hang-up can take place in many different ways. However, hang-up is effected most commonly either by the DTE equipment 63 signalling that the connection shall be released, through the AT-commands (or through a corresponding communications protocol) or the PLMN network 67 signals that the other party has terminated the connection. The sixth step 81 is followed by a seventh step 83 in which the mobile telephone modem 51 switches to an idle mode.

When it is decided in the fifth step 79 in FIG. 3 that the call has not been connected, there is carried out an eighth step 85 in which an error message from the PLMN network 67 is registered. In this event, the mobile telephone modem 51 asks to be given the error message, through the medium of AT-commands to the mobile telephone 65 (in a number of mobile telephone models, however, the error message will be delivered without the request needing to be made). With regard to the GSM network, such error messages are designated extended error reports. A GSM network is able to signal different error messages when a call connection attempt has been unsuccessful. An example of one such error message is when the data bearer service requested is not supported by the GSM network.

The eighth step 85 in FIG. 3 is followed by a ninth step 87 in which it is ascertained whether or not the selected data bearer service DBS(J) is supported by the PLMN network 67, on the basis of the error message.

If it is determined in the ninth step 87 in FIG. 3 that the data bearer service DBS(J) is supported by the PLMN network 67, the procedure continues with a tenth step 89 in which the mobile telephone modem 51 sends a standard AT response to the DTE equipment 63. This AT response provides information as to why the connection has not been made in spite of the selected data bearer service DBS(J) being supported by the PLMN network. For instance, the called unit corresponding to number nn may be engaged, disconnected or receives no ring signal. The most probable reason for the absence of a ring signal is because the mobile telephone 65 and the mobile telephone modem 51 are not connected correctly. The tenth step 89 is followed by an eleventh step 91 in which the mobile telephone modem 51 goes into an idle mode.

If it is determined in the ninth step 87 in FIG. 3 that DBS(J) is not supported by the PLMN network 67 there is carried out a twelfth step 93 in which the court-variable J is increased by one, whereafter the procedure re-commences from the third step 75. The procedure is then continued in the aforedescribed manner with respect to lower rank data bearer services, until it is determined in the fifth step 79 that the call has been connected with the data bearer service setting set to DBS(J) (for the current value of J) or that it is decided in the ninth step 87 that although DBS(J) is supported by the PLMN network, connection of the call has nevertheless been unsuccessful. Thus, the procedure in FIG. 3 enables a connection to be made to the highest ranked data bearer service supported by the PLMN network according to the stored ranking order of data bearer services DBS(1), . . . , DBS(N), provided that it is at all possible to make the connection.

For instance, the data bearer services may be ranked firstly in accordance with connection set-up time, wherein it is suitable to select a data bearer service that utilizes V.110 as the highest ranked data bearer service DBS(1), V.110 being an ITU-T standard for a rate adaptation protocol for ISDN networks, as is well known to the person skilled in this art. For instance, GSM networks utilize to a large extent the same mechanisms for adapting the data rate of the DTE equipment to the actual data rate on the radio channel.

The data bearer services may also be ranked in accordance with data rate. In this regard, the data rate on the radio link to the PLMN network 67 and the ability to utilize a data bearer service with compression protocol both play a part in the selection of the most beneficial data bearer service. An example of a ranking order of data bearer services (DBS(1), . . . , DBS(N) suitable in this respect is shown in Table 1 below.

Table 1

DBS(1) Synchronous and transparent
DBS(2) Asynchronous and non-transparent with or without data compression
DBS(3) Asynchronous and transparent The data bearer services may also be ranked in accordance with robustness. Some data bearer services are more robust than others with respect to normal interference on the radio link to the PLMN network 67. An error correction protocol can be used conveniently to obtain high robustness, particularly in the case of low signal strengths. For instance, with regard to the GSM system it is suitable to select a data bearer service with RLP protocol as the highest ranked data bearer service. Table 2 below gives an example of a ranking order of data bearer services DBS(1), . . . , DBS(N) in this regard.

Table 2

DBS(1) Asynchronous and non-transparent
DBS(2) Asynchronous and transparent
DBS(3) Synchronous and transparent A fourth method of ranking data bearer services is to rank said services in accordance with availability in the operators networks.

Although FIG. 2 is concerned solely with a ranking order of data bearer services DBS(1), . . . , DBS(N) stored in the mobile telephone modem 51, it will be understood that more ranking orders can be stored in the mobile telephone modem 51 in accordance with other criteria. If several ranking orders have been stored, one of these ranking orders is suitably chosen as a default, and the mobile telephone modem is therewith adapted to enable the user to select a ranking order other than default if he/she so desires.

According to the present invention, it is also proposed that the mobile telephone modem 51 is adapted to update at least one of the stored ranking orders of data bearer services in respect of at least one information parameter. Alternatively, the mobile telephone modem 51 may be adapted to update which ranking order shall be default in accordance with the information parameters. One or more of the information parameters is/are preferably fetched from the mobile telephone 65. For instance, signal strength measured by the mobile telephone 65 may be one of the information parameters. This information is fetched from the mobile telephone 65 with the aid of the AT-commands (or corresponding communications protocol). By following a predetermined algorithm stored in the storage unit 59 in the form of a program, the ranking order of data bearer services most favourable at that time is selected on the basis of said information. Other information parameters that can be used include the country from which the call originates—information in this respect is fetched from the mobile telephone 65—the number nn that is called, and information as to whether a call has been successfully connected to this number. This information is obtained from the mobile telephone 65 with the aid of AT-commands (or corresponding communications protocol). Different operators that provide PLMN networks which support different data bearer service set-ups may exist in one and the same country. Information as to how the communications system behaves is stored, for instance, in the storage unit 59 in a memory means whose content will not be lost should no electric voltage be applied to the mobile telephone modem 51, for instance a so-called FLASH memory.

Although the mobile telephone modem 51 in FIG. 2 is shown as a free-standing unit coupled between the DTE unit 63 and the mobile telephone 65, it will be understood that the modem 51 need not necessarily be a free-standing unit, but may alternatively be implemented beneficially as an integrated part of the DTE unit 63 or the mobile telephone 65.

What is claimed is:

1. A method relating to the establishment of data communication in a telecommunications system that includes at least one mobile telephone network wherein a mobile telephone modem is coupled between a data terminal equipment and a mobile telephone that is coupled to the mobile telephone network, said method comprising the steps of:

generating at least one ranking order having a plurality of data bearer services, each of said plurality of data bearer services relating to mobile data communications;

selecting one of the at least one ranking order;

selecting from the one ranking order a data bearer service having a highest rank which has not already been selected from the plurality of data bearer services in the one ranking order;

calling with a data bearer service setting of the mobile telephone modem set to the selected data bearer service;

determining whether or not a connection has been made;

determining whether or not the selected data bearer service is supported by the mobile telephone network when it is determined that no connection has been made; and repeating said step of selecting a data bearer service from the one ranking order, said calling step, and said determining steps until the connection has been made or the selected data bearer service is supported by the mobile telephone network.

2. The method according to claim 1, wherein said step of generating further includes ranking the at least one data bearer service in at least one of the at least one ranking order in accordance with connection time.

3. The method according to claim 1, wherein the step of generating further includes ranking the at least one data bearer service in at least one of the at least one ranking order in accordance with data rate.

4. The method according to claim 1, wherein the step of generating further includes ranking the at least one data bearer service in at least one of the at least one ranking order in accordance with availability.

5. The method according to claim 1, wherein the step of generating further includes ranking the at least one data bearer services in at least one of the at least one ranking order in accordance with robustness.

6. The method according to claim 1, further comprising the step of collecting at least one information parameter.

7. The method according to claim 6, wherein said step of collecting further includes fetching the at least one information parameter from the mobile telephone.

8. The method according to claim 6, further comprising the step of updating at least one of the at least one ranking order on the basis of the at least one information parameter.

9. The method according to claim 6, wherein said step of selecting from the one ranking order further includes selecting the data bearer service on the basis of the at least one information parameter.

10. A mobile telephone modem coupled between data terminal equipment and a mobile telephone that is coupled to a mobile telephone network, said mobile telephone modem comprising:

memory means for storing at least one ranking order having a plurality of data bearer services, each of said plurality of data bearer services relating to mobile data communications;

first means for selecting one of the at least one ranking order;

second means for selecting from the one ranking order a data bearer service having a highest rank that has not already been selected from a plurality of data bearer services in the one ranking order;

means for calling with a data bearer service of the mobile telephone modem set to the selected data bearer service;

first means for determining whether or not a connection has been made; and second means for determining whether the selected data bearer service is supported by the mobile telephone network when it is determined that no connection has been made, wherein said second selecting means, said calling means and said first and second determining means operate until the connection has been made or the selected data bearer service is supported by the mobile telephone network.

11. The mobile telephone modem according to claim 10, wherein the at least one data bearer service are ranked in accordance with call connection times.

12. The mobile telephone modem according to claim 10, wherein the at least one data bearer service are ranked in accordance with data rate.

13. The mobile telephone modem according to claim 10, wherein the at least one data bearer service are ranked in accordance with availability.

14. The mobile telephone modem according to claim 10, wherein the at least one data bearer service are ranked in accordance with robustness.

15. The mobile telephone modem according to claim 10, further comprising means for fetching at least one information parameter from the mobile telephone.

16. The mobile telephone modem according to claim 15, further comprising means for updating at least one of the at least one ranking order on the basis of the at least one information parameter.

17. The mobile telephone modem according to claim 15, wherein the means for selecting from the one ranking order further includes means for selecting the data bearer service on the basis of the at least one information parameter.

* * * * *